Jan. 10, 1956  R. R. GORDON  2,730,230
MACHINE TOOL ATTACHMENT
Filed July 3, 1951  3 Sheets-Sheet 1

INVENTOR.
RALPH R. GORDON
BY
*James B. Christie*
ATTORNEY

Jan. 10, 1956  R. R. GORDON  2,730,230
MACHINE TOOL ATTACHMENT
Filed July 3, 1951  3 Sheets-Sheet 2
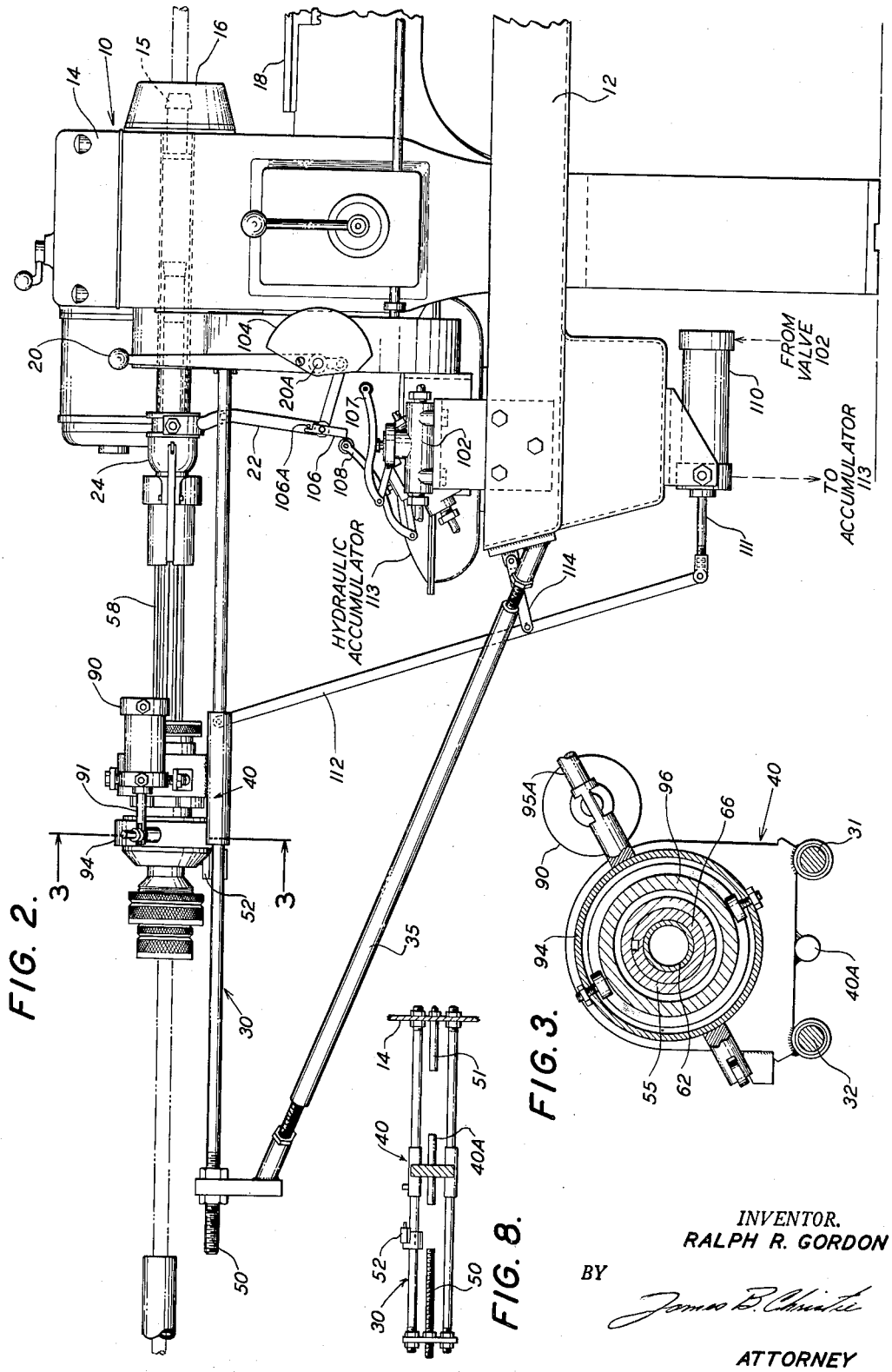
INVENTOR.
RALPH R. GORDON
BY
ATTORNEY Jan. 10, 1956           R. R. GORDON           2,730,230
MACHINE TOOL ATTACHMENT
Filed July 3, 1951           3 Sheets-Sheet 3
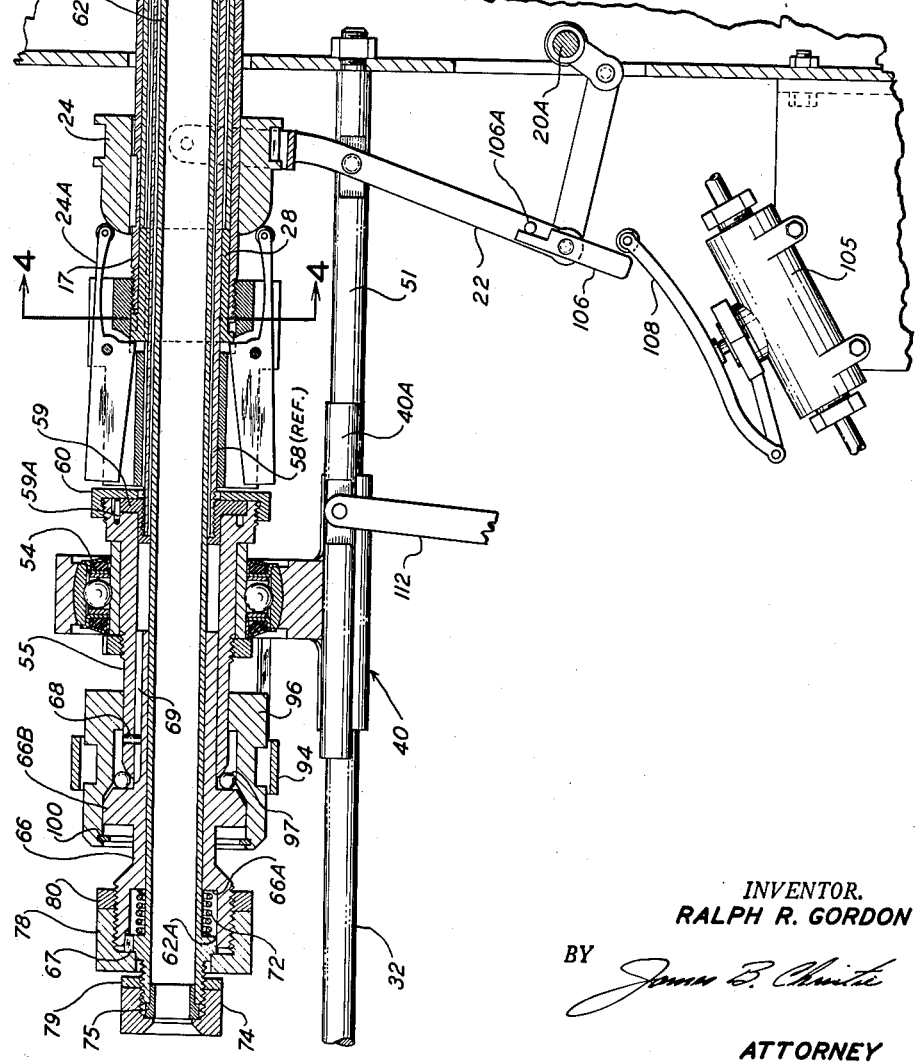
*INVENTOR.*
*RALPH R. GORDON*
BY *James B. Christie*
*ATTORNEY.*

United States Patent Office 2,730,230
Patented Jan. 10, 1956

2,730,230
MACHINE TOOL ATTACHMENT

Ralph R. Gordon, La Crescenta, Calif.

Application July 3, 1951, Serial No. 234,961

15 Claims. (Cl. 203—159)

This invention is in the machine tool art and is particularly directed to an automatic work-feed for turret lathes, automatic screw machines, automatic cutoff machines, and in general any turning machine tool in which a work piece is fed through a headstock and a driving collet supported by the headstock.

The apparatus of the invention is described with relation to its use and application with a conventional turret lathe as exemplifying use with any turning machine of the class described. A turret lathe includes a headstock, a driving collet supported at the inboard end of the headstock by a spindle passing through the headstock, motor means for driving the spindle to rotate the driving collet, a work piece held by the collet, and chuck means for opening and closing the collet to release or grip a work piece. A lathe of this type includes provision for feeding a work piece, say a draw bar, through the headstock from the outboard side into and through the spindle and the collet to project from the inboard side of the headstock. Feeding means for this purpose presently take various forms and in some cases are semi-automatic. I have now provided automatic means for feeding draw bars into such a lathe whereby a predetermined length of stock is inserted through the collet each time the collet is opened to release a piece upon which the desired turning operation has been completed.

In effectuating the objectives hereinabove stated, the invention contemplates in turning machine tools of the type including a headstock, a driving collet supported by the headstock, and means for opening and closing the driving collet, automatic feeding apparatus comprising a track extending from the outboard side of the headstock, a carriage slidably supported on the track, a feeding collet supported by the carriage inwardly therefrom, means operable responsive to opening and closing the driving collet for displacing the carriage inwardly and outwardly respectively on the track, and means operable to open and close the feed collet as the carriage reaches the inner and outer extremities of its track displacement.

The apparatus differs from conventional feeding mechanisms in the provision of positive displacement of the draw bar so that only a single movement thereof is required to insert a predetermined length through the driving collet. This is in contrast to the present practice of overfeeding the draw bar and thereafter retracting it to the desired work length.

The driving collet of a conventional turning machine tool may be actuated automatically or by means of a lever manipulated by an operator. I make use of the collet actuating mechanism to control the operations necessary to automatically feed a new length of bar stock through the driving collet. Since the description of the invention is with reference to its use in a conventional turret lathe, operation of the described embodiment is responsive to manual manipulation of the collet control lever.

The invention will be more clearly understood from the following detailed description thereof taken in conjunction with the accompanying drawings in which:

Fig. 2 is an elevation of the apparatus of Fig. 1;

Fig. 3 is a transverse section taken on the line 3—3 of Fig. 2;

Fig. 5 is a longitudinal section taken on the line 5—5 of Fig. 1;

Fig. 6 is an enlarged section of a portion of the feed mechanism shown in Fig. 5;

Fig. 8 is a plan view of the carriage track with the carriage cut away.

Figures 1, 4, 7:
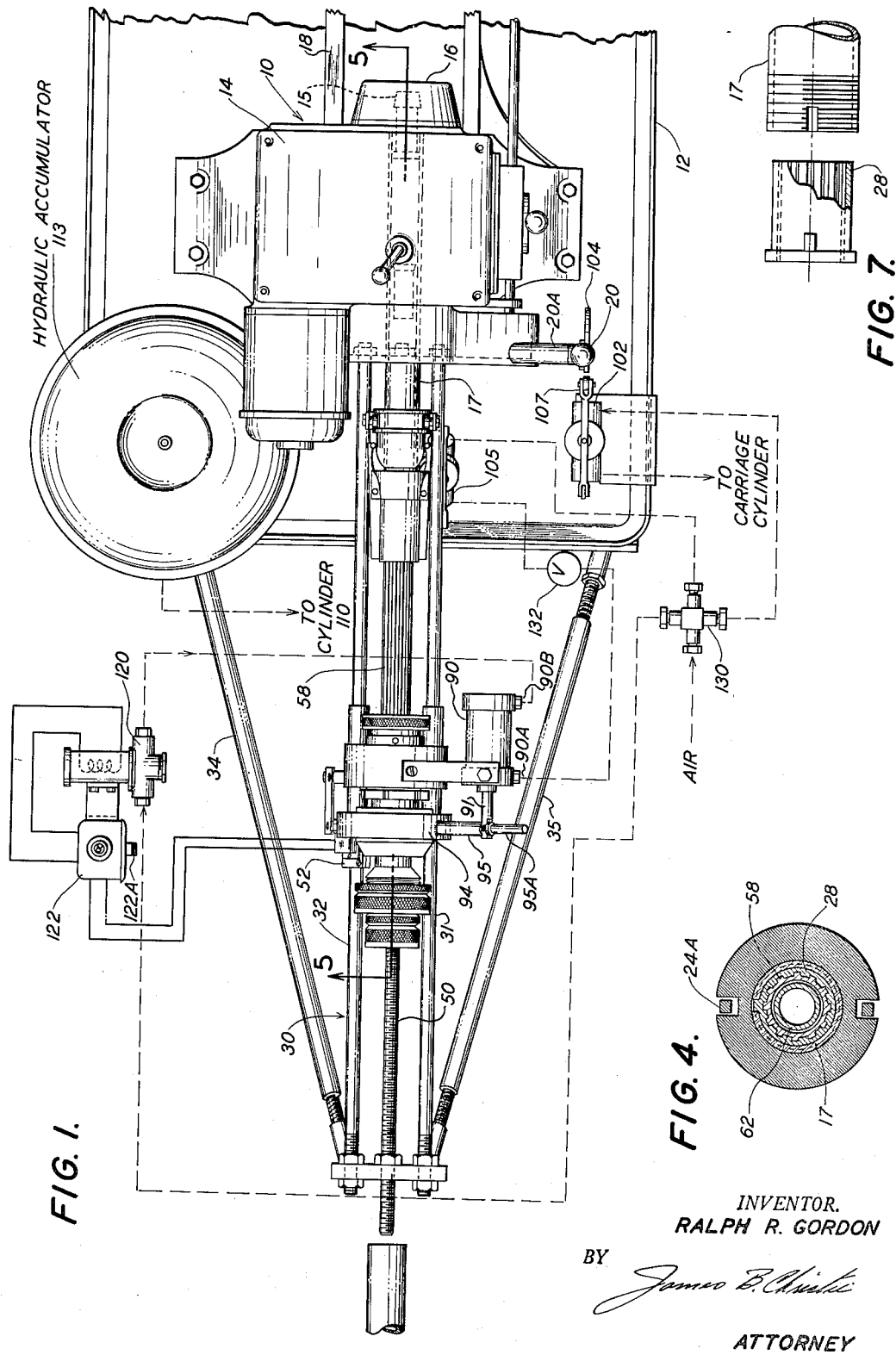
Fig. 1 is a plan view of a portion of a turret lathe on which the apparatus of the invention is mounted.
Fig. 4 is a transverse section taken on the line 4—4 of Fig. 5.
Fig. 7 is an enlarged exploded view of the outboard end of the spindle assembly.

Referring to Figs. 1 and 2 of the drawing, a portion of a conventional turret lathe 10 is shown. The lathe 10 comprises a framework 12 supporting a conventional headstock 14. A chuck 16 is mounted on the inboard end of a spindle 17 above a lathe bed 18. A driving collet 15 is mounted on the inboard end of a tube 27 concentrically disposed within the spindle 17. The collet 15 is opened and closed by manipulation of a collet lever 20 which, through suitable mechanical linkage 22, operates a conventional clutch 24 engaging the outboard end of the spindle and tube 27 all in the conventional manner.

Referring to Fig. 5, the collet 15 is shown disposed within the headstock 14 projecting into the chuck 16. The collet is partially enclosed within the inboard end of the spindle 17 and is supported therein at the end of the inner concentric tube 27. The tube 27 is displaced longitudinally with respect to the spindle by means of the clutch mechanism 24 as actuated by the collet lever to retract or inject the collet into the chuck 16. As the tube 27 is displaced toward the inboard end of the headstock, collet 15 is wedged into the tapered bore of the chuck 16 and is thereby closed on a piece of feed stock passing through the collet. To release the feed stock the clutch mechanism 24 through the medium of lever arms 24A releases the thrust on the tube 27, the normal tendency of the collet to expand causing it to back out to the position shown in Fig. 5.

Referring again to Figs. 1 and 2, and to Fig. 8, a track 30 comprising a pair of parallel rails 31, 32 projects from the outboard side of the headstock 14, being anchored at one end adjacent the headstock and supported adjacent its outer end by braces 34, 35.

A carriage 40 is slidably mounted on the rails and carries mechanism for supporting and feeding a draw bar into the driving collet 15. The mechanism supported by the carriage 40 is best described by reference to all of Figs. 1, 2 and 5.

As previously shown in Fig. 8, the carriage 40 travels on the track 30 between an adjustable stop 50 supported from the outer end of the rails and an inner fixed stop 51 supported from the headstock. A microswitch 52 is mounted to be actuated each time the carriage strikes the adjustable stop for the reason hereinafter described. The microswitch is shown mounted to one of the rails. The carriage 40 includes a stop engaging member 40A depending between the rails to strike the centrally located outboard and inboard stops as the carriage is displaced therebetween.

The carriage construction is shown in detail in the longitudinal section of Fig. 5. The carriage supports an annular bearing 54 through which is mounted a tubular bearing sleeve 55. A tube 58 is fastened at one end to the inner end of the bearing sleeve by a bushing 59 and a collar 60. A pin 59a connects the bushing and sleeve. The tube 58 extends into the tube 27 concentrically therewith. An inner or draw tube 62 is mounted within the tube 58 and supports a feeding collet 64 on its inner end, the feeding collet 64 being enclosed within the inner end of the driving collet supporting tube 27. The inner edge of tube 58 is beveled and the feeding collet is closed by forcing it against this beveled edge, this being accomplished by retracting tube 62 within tube 58.

The outer or outboard end of the draw tube 62 passes through the bearing sleeve 55 and through a sleeve 66, one end of which projects into the bearing sleeve. The sleeves 55 and 66 are keyed together by means of a pin 68 mounted in the bearing sleeve and extending into a longitudinal keyway 69 in the sleeve 66. Draw tube 62 is in turn keyed to sleeve 66 at 67.

An internally splined bushing 28 is mounted within the outboard end of the spindle 17, the tube 27 abutting the inboard end of the bushing and the splined tube 58 keying to the bushing. The clutch lever arm 24a engages the outboard end of the bushing to displace tube 27 and to force the collet 15 into the chuck. The splined bushing (see Fig. 7) is keyed to the spindle providing a positive drive between the spindle and the tube 58 which in turn is connected to drive the bearing sleeve, the sleeve in turn driving the sleeve 66 and the latter driving the draw tube 62. A positive drive is in this way provided for the feed mechanism, there being no dependence on the draw bar for this purpose. The spindle drive is conventionally through gears 17A, 17B housed within the head stock.

The draw tube 62 is spring-loaded with respect to the sleeve 66 by a helical spring 72 disposed around the tube and abutting at one end against an annular shoulder 62A on the tube and at the other end against an annular shoulder 66A on the sleeve 66. The tube 62 and sleeve 66 are held in spring-loaded relation by a cap nut 78 threaded on the end of sleeve 66. A bushing 75 is held by a second cap nut 74 threaded on the end of tube 62. Lock washers 79, 80 respectively lock the nuts 74, 78 in position. The tube 62 is free to move inwardly with respect to the sleeve 66 agains tthe loading of spring 72 and within the limits defined by the clearance between lock washer 79 and cap nut 78.

The play in draw tube 62, resisted by the loading spring 72, provides automatic compensation for variations in draw bar diameter. Restriction of the feeding collet on a draw bar is a function of the relative longitudinal position of tubes 58 and 62 which is in turn a function of the displacement of tube 62 with respect to the carriage 40. This displacement is fixed as hereinafter described and if compensating provision were not made a small variation in draw bar diameter would result in a tremendous change in collet pressure which might easily be sufficient to break the mechanism. The play between draw tube 62 and sleeve 66 automatically maintains the collet restriction at an approximately constant value.

The mechanism for operating the carriage and shifter sleeve to accomplish automatic feed, as herein provided, is best seen in Figs. 1, 2 and 5. An air piston cylinder 90 is supported by the carriage 40 to travel therewith and has a piston rod 91 connected to a shift arm 95 of a yoke 94 overriding and engaging a shift sleeve 96. The shift sleeve 96 overlies the bearing sleeve 55 and the spring-loaded sleeve 66. The outboard end of the bearing sleeve is provided with an arcuate face directed towards an annular shoulder 66B on the sleeve 66. The shift sleeve 96 is enlarged internally to circumscribe shoulder 66B and is provided adjacent its outboard end with limit ring 100 which engages shoulder 66B in sleeve 66 as the shift sleeve is displaced toward the right as viewed in the drawing, insuring displacement of the sleeve responsive to displacement of the shift sleeve. A plurality of spherical balls 97 are housed in the annulus defined by the shift sleeve 96, the annular shoulder 66B and the outboard arcuate end face of the bearing sleeve 55. Referring particularly to Fig. 5, as the shift sleeve 96 is displaced toward the headstock of the lathe (toward the right in the drawing), the spherical bearings 97 are enabled to travel upwardly on the arcuate end face of the bearing sleeve 55 as the enlarged portion of the shift sleeve is brought into transverse alignment with the balls as shown in Fig. 6. The resistance of the feed collet to compression will normally cause the sleeve 66 to follow the shift sleeve in this releasing direction. If it does not limit ring 100 will insure such action.

A first vented air valve 102 connected between a source of air under pressure and a hydraulic cylinder 110, is mounted adjacent the control level 20. A cam 104 is mounted to rotate with the lever to actuate the air valve 102 by engagement with an arm 107 projecting from the valve.

The opposite side of cylinder 110 is connected to an accumulator 113, the cylinder and accumulator forming a hydraulic system on one side of a piston (not shown) in the cylinder, the cylinder being connected on the opposite end to the air valve 102 as above described. The aforementioned piston (not shown) has a piston rod 111 extending from the cylinder 110 and pivotally connected at its outer end to a carriage actuating arm 112, the arm 112 being fulcrumed at a link 114 pivotally connected to the arm between the piston rod 111 and the carriage 40 and pivotally connected to the framework of the lathe. It is apparent from Fig. 2 that displacement of the piston rod 111 towards the left responsive to application of compressed aid into the cylinder 110 will displace the carriage 40 toward the right, and displacing hydraulic fluid into the accumulator. When the air pressure is relieved the hydraulic head returns the piston and carriage to original position.

A second vented air valve 105 is mounted on the lathe chassis adjacent the linkage 22 and is connected between a source of pressure and inlet port 90A of the air piston 90. The valve 105 has a valve arm 108 actuated by a trip pin 106 depending from the knee of toggle connection 22 between lever 20 and clutch 24. The pin 106 is pivotally mounted to the toggle and abuts a stop 106A so as to override the valve arm 108 as it swings outwardly from the lower shaft 20A and actuates the arm on the return sweep. Actuation of the valve in this manner passes a pulse of air into air piston cylinder port 90B displacing the piston therein (not shown) toward the lathe headstock. The shift sleeve 96 is thereby similarly displaced to open the feed collet this action being synchronized with the return travel of the carriage 40.

A vented solenoid operated valve 120 is connected through a relay and power source 122 to be actuated responsive to microswitch 52 and is connected between a source of air pressure and port 90B of air piston cylinder 90. As the carriage 40 reaches its retracted position striking the microswitch, valve 120 is opened to pass air into the piston cylinder 90, valve 105 being simultaneously vented to return the shift sleeve to the illustrated position closing the feed collet 64 on the draw bar. A manifold 130 is connected to a source of air under pressure and to each of valves 102, 105, 120 to apply air pressure to these valves. A manual shut off valve 132 provides means for de-activating the feed mechanism if desired by blocking air flow from valve 105 to the piston cylinder 90.

Operation of the apparatus is as follows: A work piece or draw bar is passed through the draw tube 62 extending through the feeding collet and driving collet 15, carriage 40 resting at the inboard end of its travel with the feed and drive collets open to receive the bar.

The feed collet is opened for this purpose by manual manipulation of yoke 94 through the extension 95A on the yoke link 95, the valve 102 being vented at this stage. The new draw bar is generally inserted past the cut off tool, the first operation on such a new piece generally being an initial cut off to achieve a machined end.

The manual switch 122A, associated with valve 120, is then closed and since the carriage 40 strikes the microswitch 52 in the retracted position achieved responsive to closing the drive collet by means of lever 20, valve 120 is opened, thereby closing the feed collet as above described. As the driving collet of the machine is opened upon completion of the first piece by manipulation of the collet lever 20, the cam 104 striking the valve arm 107 actuates the air valve 102, admitting air to the hydraulic cylinder 110 whereby the carriage 40 is displaced until it strikes the inboard stop. The feed collet remains closed during this operation, feeding a predetermined length of the bar stock through the open driving collet, the length of stock thus fed being predetermined by the setting of the adjustable stop 50, i. e. equal to the total displacement of the carriage 40. The driving collet is then closed by manipulation of the collet lever 20, in which process the trip pin 106 strikes and actuates the valve arm of valve 105 feeding air under pressure to the cylinder 90, the air from the opposite end of the cylinder being vented through the now disengaged valve 120 which, as above described, opens the feeding collet. At the same time the cam, on the return stroke of the collet lever 20, frees the valve arm 107, releasing the air pressure to the hydraulic cylinder 110. Hydraulic oil from the accumulator flows back to the air cylinder, the hydraulic head being sufficient to return the carriage 40 to the outboard limit of its travel. As the carriage strikes the outboard stop it simultaneously strikes microswitch 52 which opens the solenoid controlled air valve 120 admitting air to the opposite side of the air cylinder 90, to close the feeding collet. The mechanism is then at the beginning of a new cycle.

Because of space limitations, the mechanism for actuating the feed collet has to be placed at the outboard end of the machine spindle. However, the invention insures a minimum scrap bar end by location of the feeding collet inside the spindle so that its inboard travel brings it substantially up to the drive collet. In this manner substantially an entire draw bar is used. Since the drive collet is closed when the feeding collet is open and vice versa and since the mechanism rotates independently of the draw bar, each draw bar can be used down to a length less than the length of the desired work piece. As a result the apparatus of the invention does not increase scrap.

Since there is no relative rotary motion between the draw bar and feeding mechanism, the bar does not coast to a stop while being fed and the inertia accompanying feed of non-rotating bar is avoided. Many modifications may be made in the details of the described apparatus without departure from the fundamental concepts thereof and the scope of this invention.

I claim:

1. Automatic feeding apparatus for turning machine tools of the type including a headstock, a chuck supported at the inboard end of the headstock by a spindle passing through the headstock, a driving collet supported in the chuck by a first draw tube concentrically disposed within the spindle, and control means for rotating the spindle and first draw tube and for causing longitudinal displacement of the two to open and close the driving collet, which automatic feeding apparatus comprises a track extending from the outboard side of the headstock and parallel to the longitudinal axis of the spindle, a carriage slidably mounted on the track, outboard and inboard stops for limiting the displacement of the carriage on the track, a fixed tube rotatably fastened to the carriage and extending into the first draw tube coaxially therewith and to a point within the headstock adjacent the driving collet, a second draw tube mounted coaxially within said fixed tube and extending from the outboard end thereof, a feed collet mounted on the inner end of the second draw tube and extending beyond the inner end of the fixed tube, clutch means mounted on the carriage for causing relative longitudinal motion of the fixed tube and second draw tube, means operable responsive to carriage travel to actuate the clutch, and means operable responsive to operation of the driving collet control means to cause the carriage to travel on the track.

2. Apparatus according to claim 1 wherein said clutch means comprises a first tubular sleeve affixed to and projecting from the outboard end of said fixed tube, the outboard edge of the tubular sleeve being beveled in arcuate configuration, a second tubular sleeve keyed to the first tubular sleeve and longitudinally displaceable with respect thereto, means spring loading the second draw tube to said second tubular sleeve, a clutch sleeve overriding the mating ends of the first and second tubular sleeves, a plurality of spherical balls confined in an annulus defined by said tubular sleeves and clutch sleeve and riding on the outboard end surfaces of the first tubular sleeve, and a shift yoke connected to the clutch sleeve.

3. Apparatus according to claim 1 wherein the means operable to actuate the clutch comprises an air actuated piston disposed within a cylinder and connected exteriorly of the cylinder to a shift yoke engaged with said clutch, a source of air under pressure, a first valve connected between said source and said cylinder, a microswitch mounted in the path of said carriage to be actuated by carriage contact at the outboard extremity of carriage travel and electrically connected to actuate said first valve, a second valve connected between said source of air under pressure and the other end of said cylinder, means operable responsive to operation of said control means for the driving collet to actuate said second valve responsive to initiation of carriage travel toward the outboard stop.

4. Apparatus according to claim 1 wherein the means operable responsive to operation of the driving collet to cause carriage travel comprises a piston disposed within a piston cylinder, means connecting the piston exteriorly of the cylinder to the carriage to cause carriage displacement responsive to piston displacement, a reservoir for hydraulic fluid connected to one end of said cylinder, a source of air under pressure, a valve, means connecting said source to the cylinder through the valve, and means operable responsive to operation of said control means for the driving collet to actuate said valve.

5. Automatic feeding apparatus for turning machine tools of the type including a headstock, a chuck supported at the inboard end of the headstock by a spindle passing through the headstock, a driving collet supported in the chuck by a first draw tube concentrically disposed within the spindle, and control means for rotating the spindle and first draw tube and for causing longitudinal displacement of the two to open and close the driving collet, which automatic feeding apparatus comprises a track extending from the outboard side of the headstock and parallel to the longitudinal axis of the spindle, a carriage slidably mounted on the track between outboard and inboard stops, a fixed tube rotatably fastened to the carriage and extending into the first draw tube coaxially therewith and to a point within the headstock, a second draw tube rotatably supported to the carriage and extending coaxially within the fixed tube, a feed collet mounted on the inner end of the second draw tube and extending beyond the inner end of the fixed tube, clutch means rotatably mounted on the carriage for causing relative longitudinal motion of the fixed tube and second draw tube, means operable responsive to carriage travel to actuate the clutch, and means operable responsive to manipulation of the driving collet control means to cause the carriage to travel on the track.

6. Automatic feeding apparatus for turning machine tools of the type including a headstock, a chuck supported at the inboard end of the headstock by a spindle passing through the headstock, a driving collet supported in the chuck by a first draw tube concentrically disposed within the spindle, and control means for rotating the spindle and first draw tube and for causing longitudinal displacement of the two to open and close the driving collet, which automatic feeding apparatus comprises a track extending from the outboard side of the headstock and parallel to the longitudinal axis of the spindle, a carriage slidably mounted on the track between outboard and inboard stops, a fixed tube rotatably fastened to the carriage and extending into the first draw tube coaxially therewith and to a point within the headstock, means keying the fixed tube to the spindle to cause rotation thereof responsive to spindle rotation, a second draw tube rotatably supported by the carriage and extending coaxially within said fixed tube, a feed collet mounted on the inner end of the second draw tube and extending beyond the inner end of the fixed tube, clutch means mounted on the carriage for causing relative longitudinal motion of the fixed tube and second draw tube, means for rotating the clutch responsive to rotation of the fixed tube, means for rotating the second draw tube responsive to rotation of the clutch, means operable responsive to carriage travel to actuate the clutch, and means operable responsive to operation of the driving collet control means to cause the carriage to travel on the track.

7. Apparatus according to claim 6 wherein the inboard end edge of said fixed tube is beveled inwardly toward the axis of rotation.

8. Apparatus according to claim 6 wherein said means keying the fixed tube to the spindle comprises an internally splined bushing keyed to the spindle, the fixed tube being splined externally and meshed with the splined bushing.

9. Automatic feeding apparatus for turning machine tools of the type including a headstock, a chuck supported at the inboard end of the headstock by a spindle passing through the headstock, a driving collet supported in the chuck by a first draw tube concentrically disposed within the spindle, and control means for rotating the spindle and first draw tube and for causing longitudinal displacement of the two to open and close the driving collet, which automatic feeding apparatus comprises a track extending from the outboard side of the headstock and parallel to the longitudinal axis of the spindle, a carriage slidably mounted on the track, outboard and inboard stops for limiting displacement of the carriage on the track, a fixed tube rotatably fastened to the carriage and extending into the first draw tube coaxially therewith and to a point within the headstock, means keying the first tube to the spindle to rotate therewith, a second draw tube rotatably supported by the carriage and extending coaxially within said fixed tube, a feed collet mounted on the inner end of the second draw tube and extending beyond the inner end of the fixed tube, clutch means mounted on the carriage for causing relative longitudinal motion of the fiixed tube and second draw tube, means for rotating the clutch and second draw tube responsive to rotation of the fixed tube, means operable responsive to carriage travel to actuate the clutch, and means operable responsive to manipulation of the driving collet control means to cause the carriage to travel on the track.

10. Apparatus according to claim 9 wherein the track comprises two parallel rails, a tie rod connecting the outboard end of the rails, the outboard stop being threaded through the tie rod to lie between the tracks and adjustable along the longitudinal axis of the tracks.

11. Apparatus according to claim 9 wherein the carriage comprises a track engaging runner, a bearing race rigidly mounted on the runner, and a bearing mounted in the race to rotate on an axis coextensive with the axis of the spindle, the fixed tube and second draw tube being supported coaxially by the bearing.

12. Apparatus according to claim 9 wherein the track comprises parallel rails, a tie rod connecting the outboard end of the rails, the outboard stop being adjustably mounted to the tie rod to extend inwardly therefrom between the rails, and the carriage comprises a pair of parallel runners engaging the rails, a bearing race supported by the runners, a bearing mounted in the race on an axis coextensive with the axis of the spindle and supporting the fixed tube and second draw tube, and means depending between the runners to abut the inboard and outboard stops.

13. Feeding apparatus for turning machine tools of the type including a headstock, a driving collet supported on a spindle passing through the headstock and means for opening and closing the driving collet, comprising a track extending from the outboard side of the headstock, a rotatable carriage slidably supported on the track, a first tube mounted to rotate with the carriage and extending into the spindle, a second tube mounted coaxially within the first tube and extending from the outboard end thereof, a feeding collet carried by the second tube within the spindle, means operable responsive to opening and closing the driving collet for displacing the carriage inwardly and outwardly respectively on the track, and means operable to produce relative longitudinal motion between the first and second tubes to open and close the feed collet as the carriage respectively reaches the inner and outer extremities of its track displacement.

14. Automatic feeding apparatus for turning machine tools of the type including a headstock, a chuck supported at the inboard end of the headstock by a spindle passing through the headstock, a driving collet supported in the chuck, and means for rotating the spindle, which automatic feeding apparatus comprises a track extending from the outboard side of the headstock and parallel to the longitudinal axis of the spindle, a carriage slidable on the track, a first tube rotatably associated with the carriage and extending into the spindle to a point within the headstock adjacent the driving collet, a second tube mounted coaxially within the first tube and extending from the outboard end thereof, a feed collet mounted on the inner end of the second tube and extending beyond the inner end of the first tube, means for causing relative longitudinal motion of the first tube and second tube, means operable responsive to carriage travel to actuate the last named means, and means operable responsive to opening and closing of the driving collet to cause the carriage to travel on the track.

15. Feeding apparatus for turning machine tools of the type including a headstock, a driving collet supported on a spindle passing through the headstock and means for opening and closing the driving collet, comprising a first tube extending into the spindle and outwardly from the outboard side thereof, a second tube mounted coaxially within the first tube and extending from the outboard side thereof, a feed collet mounted on the inner end of the second tube and extending beyond the inner end of the second tube, means rotating the first tube in unison with the spindle, means operable to cause relative longitudinal displacement of the first and second tubes, and means operable to cause longitudinal displacement of the first and second tubes relative to the spindle.

References Cited in the file of this patent

UNITED STATES PATENTS

| Number | Name | Date |
|---|---|---|
| 1,885,224 | Brinkman et al. | Nov. 1, 1932 |
| 2,146,583 | Kylin | Feb. 7, 1939 |
| 2,147,885 | Dean | Feb. 21, 1939 |
| 2,250,088 | Baxendale | July 22, 1941 |
| 2,505,612 | Ericson | Apr. 25, 1950 |